US012715443B2

(12) United States Patent
Ghodekar et al.

(10) Patent No.: US 12,715,443 B2
(45) Date of Patent: Aug. 25, 2026

(54) PREFERRED VEHICLE LANE IDENTIFICATION FOR VEHICLE CONTROL ALONG A NAVIGATION ROUTE

(71) Applicant: GM GLOBAL TECHNOLOGY OPERATIONS LLC, Detroit, MI (US)

(72) Inventors: Abhinay Ganpatrao Ghodekar, Maple (CA); Jing Zhao, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 18/981,887

(22) Filed: Dec. 16, 2024

(65) Prior Publication Data

US 2026/0167195 A1 Jun. 18, 2026

(51) Int. Cl.

*B60W 30/18* (2012.01)
*B60W 50/14* (2020.01)
*G01C 21/34* (2006.01)
*G01C 21/36* (2006.01)

(52) U.S. Cl.

CPC ...... *B60W 30/18163* (2013.01); *B60W 50/14* (2013.01); *G01C 21/3461* (2013.01); *G01C 21/3658* (2013.01); *B60W 2050/146* (2013.01); *B60W 2552/53* (2020.02); *B60W 2556/40* (2020.02)

(58) Field of Classification Search

CPC ........... B60W 30/18163; B60W 50/14; B60W 2050/146; B60W 2552/53; B60W 2556/40; G01C 21/3461; G01C 21/3658

See application file for complete search history.

(56) References Cited

U.S. PATENT DOCUMENTS 6,622,085 B1 * 9/2003 Amita .................... G06T 17/05 340/995.14
2018/0188062 A1 * 7/2018 Woolley ................ G01C 21/36
2019/0077459 A1 * 3/2019 Miura ................ B62D 15/0265
2019/0078906 A1 * 3/2019 Woolley ................ G01C 21/36
2021/0383136 A1 12/2021 Zhang et al.
2022/0214181 A1 * 7/2022 Jafari Tafti ........ G01C 21/3453
2022/0276653 A1 * 9/2022 Wray .................. G05D 1/0214
2022/0315028 A1 * 10/2022 Kawano ............ G01C 21/3896
2024/0190457 A1 6/2024 Craig et al.

FOREIGN PATENT DOCUMENTS

DE 112019006119 T5 9/2021

OTHER PUBLICATIONS

German Office Action from counterpart DE1020251043183, dated Dec. 2, 2025.

* cited by examiner

*Primary Examiner* — Sizo B Vilakazi

(57) ABSTRACT

A vehicle system includes a vehicle control module and a control module. The control module is configured to receive a navigation route, receive a plurality of road segments defined by polygons, identify a set of road segments from the plurality of road segments based on a distance between one or more waypoints of the navigation route and the polygons, for each road segment from the set of road segments along the navigation route, determine lanes of the road segments along the navigation route and end point distances for the lanes, and identify a preferred lane along the navigation route based on the end point distances for the lanes. The vehicle control module is configured to generate a control signal for controlling at least one operation of the vehicle based on the identified preferred lane along the navigation route. Other vehicle systems and methods are also disclosed.

20 Claims, 6 Drawing Sheets

PREFERRED VEHICLE LANE IDENTIFICATION FOR VEHICLE CONTROL ALONG A NAVIGATION ROUTE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to preferred vehicle lane identification for vehicle control along a navigation route.

Vehicle and/or vehicle drivers often rely on a navigation route generated based on a selected destination on a navigation system. When generated, the navigation route provides a sequence of road-level waypoints aligned to the center of the road to guide the vehicle to the destination. In doing so, vehicle applications, such as a navigation route following application may rely on the waypoints to automatically change lanes along the navigation route.

SUMMARY

A vehicle system for controlling a vehicle, includes a vehicle control module and a control module in communication with the vehicle control module. The control module is configured to receive a navigation route, receive a plurality of road segments defined by polygons, identify a set of road segments from the plurality of road segments based on a distance between one or more waypoints of the navigation route and the polygons, for each road segment from the set of road segments along the navigation route, determine lanes of the road segments along the navigation route and end point distances for the lanes, and identify a preferred lane along the navigation route based on the end point distances for the lanes. The vehicle control module is configured to generate a control signal for controlling at least one operation of the vehicle based on the identified preferred lane along the navigation route.

In other features, the control module is configured to receive the navigation route based on a defined destination input into a navigation system.

In other features, the control module is configured to identify the set of road segments based on only the one or more waypoints being within a distance threshold from the polygons.

In other features, the control module is configured to remove one or more road segments of the identified set of road segments based on headings for the identified set of road segments.

In other features, the control module is configured to determine one or more gaps between two road segments appear due to a lack of density of the waypoints and identify correct database road segments to fill the gaps between the two road segments.

In other features, the control module is configured to identify the preferred lane along the navigation route having the longest end point distance.

In other features, the vehicle system further includes a database configured to store the plurality of road segments, wherein the control module is configured to extract the plurality of road segments from the database.

In other features, the database is an in-vehicle database.

In other features, the vehicle system further includes a display module in communication with the control module, the display module configured to display a map including the preferred lane along the navigation route.

A vehicle system includes a vehicle control module of a vehicle, a database, and a control module in communication with the vehicle control module and the database. The control module is configured to receive a navigation route based on a defined destination input into a navigation system, receive, from the database, a plurality of road segments defined by polygons, identify a set of road segments from the plurality of road segments based on a distance between one or more waypoints of the navigation route and the polygons, for each road segment from the set of road segments along the navigation route, determine lanes of the road segments along the navigation route and end point distances for the lanes, and identify a preferred lane along the navigation route having the longest end point distance. The vehicle control module is configured to generate a control signal for controlling at least one operation of the vehicle based on the identified preferred lane along the navigation route.

In other features, the database is an in-vehicle database.

In other features, the control module is configured to identify the set of road segments based on only the one or more waypoints being within a distance threshold from the polygons.

A vehicle control method includes receiving a navigation route for a vehicle, receiving a plurality of road segments defined by polygons, identifying a set of road segments from the plurality of road segments based on a distance between one or more waypoints of the navigation route and the polygons, for each road segment from the set of road segments along the navigation route, determining lanes of the road segments along the navigation route and end point distances for the lanes, identifying a preferred lane along the navigation route based on the end point distances for the lanes, and controlling at least one operation of the vehicle based on the identified preferred lane along the navigation route.

In other features, identifying the preferred lane along the navigation route includes identifying the preferred lane along the navigation route having the longest end point distance.

In other features, the vehicle control method further includes displaying a map including the preferred lane along the navigation route.

In other features, identifying the set of road segments includes identifying the set of road segments based on only the one or more waypoints being within a distance threshold from the polygons.

In other features, receiving the plurality of road segments includes receiving the plurality of road segments from an in-vehicle database.

In other features, receiving the navigation route includes receiving the navigation route based on a defined destination input into a navigation system.

In other features, the vehicle control method further removing one or more road segments of the identified set of road segments based on headings for the identified set of road segments.

In other features, the vehicle control method further determining one or more gaps between two road segments appear and identifying correct database road segments to fill the gaps between the two road segments.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle navigation routes are often generated based on a selected destination on a navigation system. Each navigation route provides a sequence of road-level waypoints to guide the vehicle to the selected destination. In doing so, vehicle applications, such as a navigation route following application may rely on the waypoints to automatically change lanes along the navigation route. While the waypoints may provide valuable information for vehicle navigation, drivers and/or vehicle applications relying on the navigation route often lack sufficient information to match the navigation route with vehicle understandable high-definition (HD) map data having lane-level map attributes desired by the drivers and/or vehicle applications. This because HD maps based on map data and navigation maps based on waypoints are created differently.

The vehicle systems and control methods according to the present disclosure leverages geometric relations and road segment connectivity to match a navigation route including its waypoints with vehicle understandable HD map data. For example, the vehicle systems and control methods herein receive a navigation route with a sequence of road-level waypoints and road segments defined by polygons, identify a set of road segments based on a distance between at least some of the waypoints and the polygons, determine lanes of the road segments along the navigation route and end point distances for the lanes, and then identify a preferred lane along the navigation route based on the end point distances. Once the preferred lane is identified, the vehicle systems and control methods can control the vehicle based on the preferred lane, as further explained herein. By relying on such geometric relations and road segment connectivity, the vehicle systems and control methods can efficiently and effectively perform map matching at a road segment level and to provide preferred lane travel for drivers and/or vehicle control applications without requiring significant computing resources.

Figure 1:
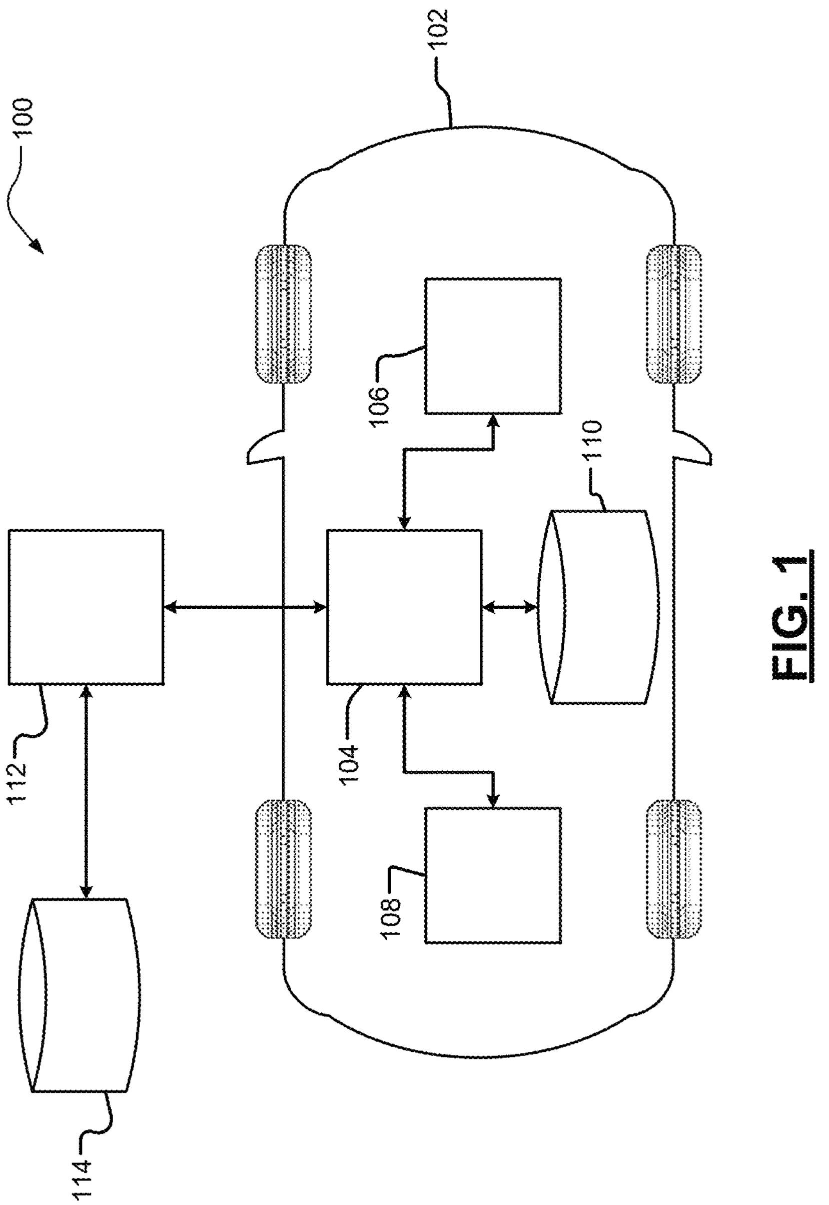
FIG. 1 is a block diagram of an example vehicle system for map matching at a road segment level and providing preferred lane travel for vehicle drivers and/or vehicle control applications, according to the present disclosure.

Referring now to FIG. 1, a block diagram of an example vehicle system 100 is presented for map matching at a road segment level and providing preferred lane travel for drivers and/or vehicle applications of a vehicle 102. As shown in FIG. 1, the vehicle system 100 generally includes a control module 104 (e.g., an in-vehicle control module), a vehicle control module 106, a display module 108, and a map database 110 (e.g., an in-vehicle map database). In various embodiments, the control module 104 may be a software application module or another suitable module. Additionally, in some examples, the vehicle system 100 may optionally include a control module 112 external to the vehicle 102 and/or a remote map database 114. In such examples, the remote map database 114 may be employed instead or in addition to the map database 110 as further explained below. In various embodiments, the control module 112 and/or the remote database 114 (if employed) may form a cloud-based architecture.

Although FIG. 1 illustrates the vehicle system 100 as including specific dedicated modules, it should be appreciated that one or more other modules may be employed if desired. For example, any combination of the modules (e.g., the control module 104, the vehicle control module 106, the display module 108, and/or the control module 112) and/or the functionality thereof may be integrated into a single module or multiple different modules. Additionally, while not shown in FIG. 1, it should be appreciated that the vehicle system 100 may also include various sensors (e.g., cameras, radar-based sensors, etc.), a vehicle navigation system (e.g., a fixed in-vehicle navigation system, a moveable navigation system, etc.), etc. if desired.

The vehicle system 100 of FIG. 1 may be employable in any suitable vehicle, such as an autonomous vehicle, a semi-autonomous vehicle, etc. Additionally, the vehicle system 100 may be applicable to electric vehicles (e.g., a pure electric vehicle, a plug-in hybrid electric vehicle, etc.) and internal combustion engine (ICE) vehicles. In the example of FIG. 1, the vehicle system 100 is employed in the vehicle 102 (e.g., an autonomous vehicle).

In the example of FIG. 1, the vehicle control module 106, the display module 108, and the map database 110 are in communication with the control module 104. In such examples, the control module 104 may receive and/or transmit signals, data, etc. between each of the vehicle control module 106, the display module 108, and the map database 110. The internal vehicle modules may receive and/or transmit signals between each other via a network, such as a controller area network (CAN), ethernet, etc. Additionally, in the vehicle 102, the control module 104 may be in communication with the external control module 112 and/or the remote map database 114 via another network (e.g., a cellular network, etc.).

With continued reference to FIG. 1, the control module 104 initially receives a navigation route for the vehicle 102. In such examples, the navigation route may be based on a defined destination input into a navigation system by, for example, a driver or another user associated with the vehicle 102. For example, a driver may select a destination with a movable navigation system (e.g., an application on a phone or another moveable device), a fixed navigation system within the vehicle 102 (e.g., an in-vehicle navigation system, etc.), etc. When the destination is selected, the navigation system generates the navigation route with waypoints. In such examples, the waypoints provide a sequence of road-level points (e.g., coordinates) aligned to the center of a road to guide the vehicle 102 to the destination.

In various embodiments, the control module 104 may receive the navigation route periodically along with a batch of waypoints. For example, the control module 104 may receive an updated navigation route with a new batch of waypoints every five seconds, ten seconds, etc. In other examples, the control module 104 may receive the navigation route with a batch of waypoints based on a defined distance traveled on the route. For instance, the control module 104 may receive an updated navigation route with a new batch of waypoints in response to the vehicle 102 traveling a defined distance (e.g., 0.5 km, 1 km, etc.) on the route.

Additionally, the control module 104 extracts or otherwise receives road segments. In such examples, each road segment is defined by a polygon to create a boundary of the road segment. As examples only, the polygon may be a triangle, a square, a rectangle, a trapezoid, a rhombus, a pentagon, a hexagon, and/or any other suitable shape having straight lines with closed sides. As one example, FIG. 2 depicts an example map (e.g., a HD map) 200 including road segments 202, 204, 206, 208, 210, 212, 214, 216, 218 each defined by a polygon and a sequence of waypoints 250, 252, 254, 256, 258, 260, 262, 264 to guide the vehicle 102 to a selected destination.

In the example of FIG. 1, the control module 104 may extract or otherwise receive the road segments defined by polygons (e.g., polygonal-shaped road segments) from a map database. For example, the map database 110 may store the polygonal-shaped road segments (or data representing the road segments). If desired, the control module 104 can request and receive or otherwise extract the polygonal-shaped road segments from the map database 110. In other examples, the remote map database 114 may store the polygonal-shaped road segments (or data representing the road segments). In such examples, the control module 104 can extract the road segments directly from the remote map database 114 or via the control module 112.

Then, the control module 104 of FIG. 1 identifies a set of road segments from the received road segments based on one or more parameters associated with the waypoints and the polygonal-shaped road segments. For example, in FIG. 1, the control module 104 can determine distances between one or more received waypoints and the polygonal-shaped road segments. Then, based on the distances, the control module 104 may identify the set of road segments. For example, the control module 104 may identify the set of road segments having the closest or smallest distance from one or more waypoints.

Figure 2:
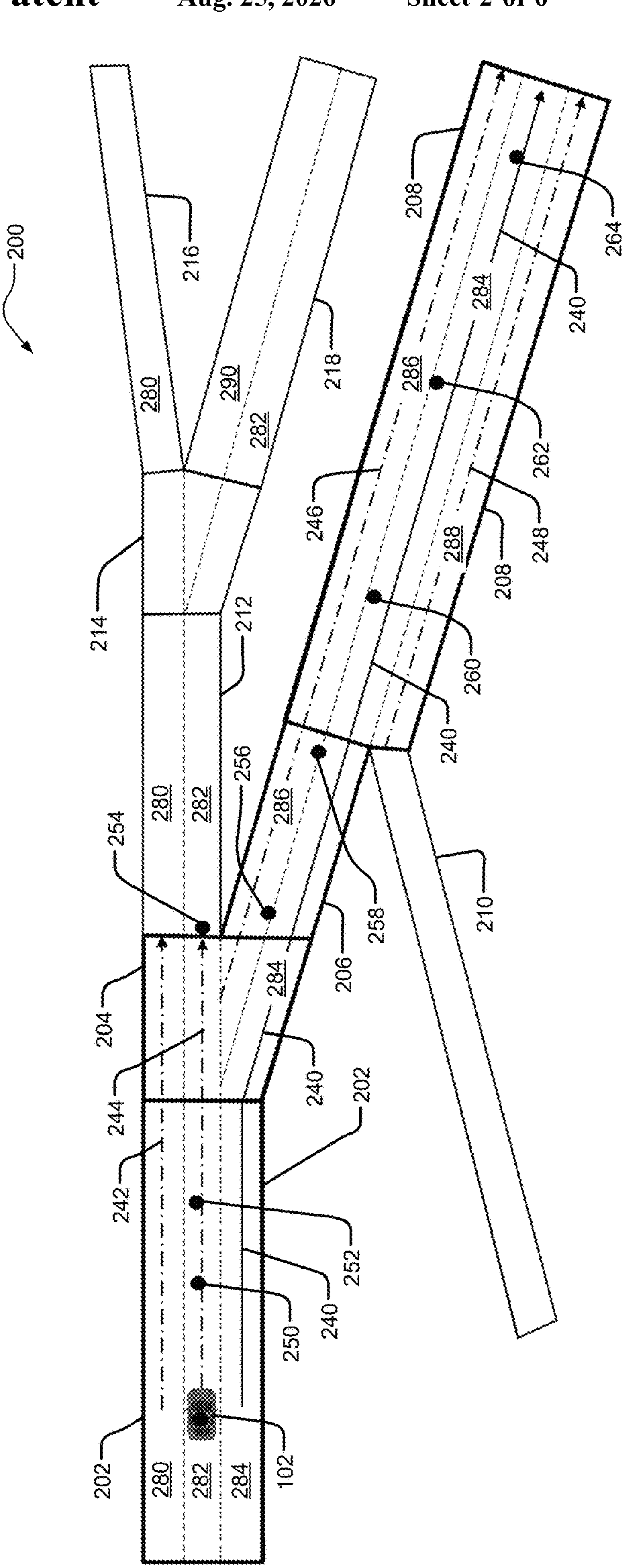
FIGS. 2-3 are block diagrams of example maps including road segments defined by polygons and a sequence of waypoints to guide a vehicle to a selected destination, according to the present disclosure.

For instance, and with continued reference to FIG. 2, the control module 104 of FIG. 1 may determine a distance between the waypoint 254 and the nearest edge of the road segment 204, the waypoint 256 and the nearest edge of the road segment 204, the waypoint 260 and the nearest edge of the road segment 206, and so on for each waypoint. In such examples, if the waypoint is located inside a road segment, the distance between the waypoint and that road segment is deemed zero.

In various embodiments, the control module 104 may rely on waypoints near a select polygonal-shaped road segment. For example, the control module 104 may only rely on waypoints being within a distance threshold from polygons to identify the set of road segments. As example only, the distance threshold may be 1.5 m, 2 m, 2.5 m, 3 m, etc.

In some examples, the control module 104 may optionally filter out one or more of the identified road segments. For example, the control module 104 may identify one or more road segments that are outliers with respect to the other identified road segments. In such examples, these road segments may have a directional heading that is different than the sequence of waypoints. In this case, the control module 104 may remove the road segment(s) based on the headings for the identified set of road segments. As one example, the control module 104 may implement equation (1) below to determine whether to remove any one of the identified road segments. As shown in equation (1), the heading for a selected road segment (RS) is compared to the heading of a selected waypoint. If the absolute value of this difference is greater than or equal to a defined threshold heading, that road segment may be removed from consideration. Alternatively, if the absolute value of this difference is less than the defined threshold heading, that road segment may be utilized for subsequent computations.

$$|\mathrm{Heading}_{RS} - \mathrm{Heading}_{WP}| \geq \mathrm{Threshold}_{Heading} \quad \text{Equation (1)}$$

In various embodiments, one or more gaps may exist between identified road segments. In such examples, a portion of a road on the navigation route may not be covered by an identified road segment. For example, the gap(s) may appear due to a lack of density of navigation waypoints. If the control module 104 determines that one or more gaps exist between two road segments based on, for example, the received navigation route and identified road segments, the control module 104 can fill a gap (if present) with one or more missed road segments to ensure the road on the navigation route is covered by road segments. In various embodiments, the control module 104 can identify missed road segments to fill the gap(s) from the map database 110.

Then, the control module 104 determines lanes of each road segment along the navigation route and an end point distance for each of the lanes. In such examples, the end point distance may refer to a distance of a lane between a start point and the end of that lane, which may extend across one or multiple road segments. In various embodiments, the start point may refer to the location of the vehicle 102, a leading edge of a road segment, a start point of a lane, etc. As further explained below, the vehicle 102 may then be controlled based on the determined distances of the lanes (e.g., the lane with the largest distance or value).

For example, with continued reference to FIG. 2, the map 200 includes a roadway having multiple lanes 280, 282, 284, 286, 288, 290 extending across some of the road segments 202, 204, 206, 208, 212, 214, 216, 218. In this example, the control module 104 can determine the end point distance of the lane 284 along the navigation route (as indicated by the waypoints) from the vehicle 102 to the end of that lane 284, which is at the end of the road segment 208. In such examples, the lane 284 extends across multiple road segments. Additionally, the control module 104 can determine the end point distances of the other lanes 280, 282, 286, 288 along the navigation route to the end of each respective lane 280, 282, 286, 288. In such examples, the distances of the lanes 280, 282 are generally the same, and extend from the vehicle 102 to the far edge of the road segment 204. The distance of the lane 286 extends from the start of the lane 286 within the road segment 204 to the far edge of the road segment 208. Further, the distance of the lane 288 extends from the start of the lane 288 at the leading edge of the road segment 208 to the far edge of the road segment 208 (e.g., across the road segment 208).

With continued reference to FIG. 1, the control module 104 may apply a weight to one or more of the determined distances of the lanes. For example, each distance may be assigned a relative value. Then, based on lane events, such as vehicle speeds, route directions, upcoming vehicle maneuvers, etc., the control module 104 may add a weight to one or more of the determined distances (or the relative values). In such examples, the lane events and/or corresponding weight values may be stored in and received from the map database 110 and/or the remote map database 114. For instance, if the navigation route indicates that the vehicle 102 should take a nearby exit ramp (e.g., upcoming vehicle maneuver, etc.), the control module 104 can apply a weight to an exit lane for the ramp to increase the lane's value. In other words, the control module 104 can apply the weight to increase the distance of the lane to a maximum value or at least greater than the distance of other lanes. The vehicle 102 may then be controlled based on the weighted distances of the lanes (e.g., the lane with the largest distance or value), as further explained below.

Figure 3:
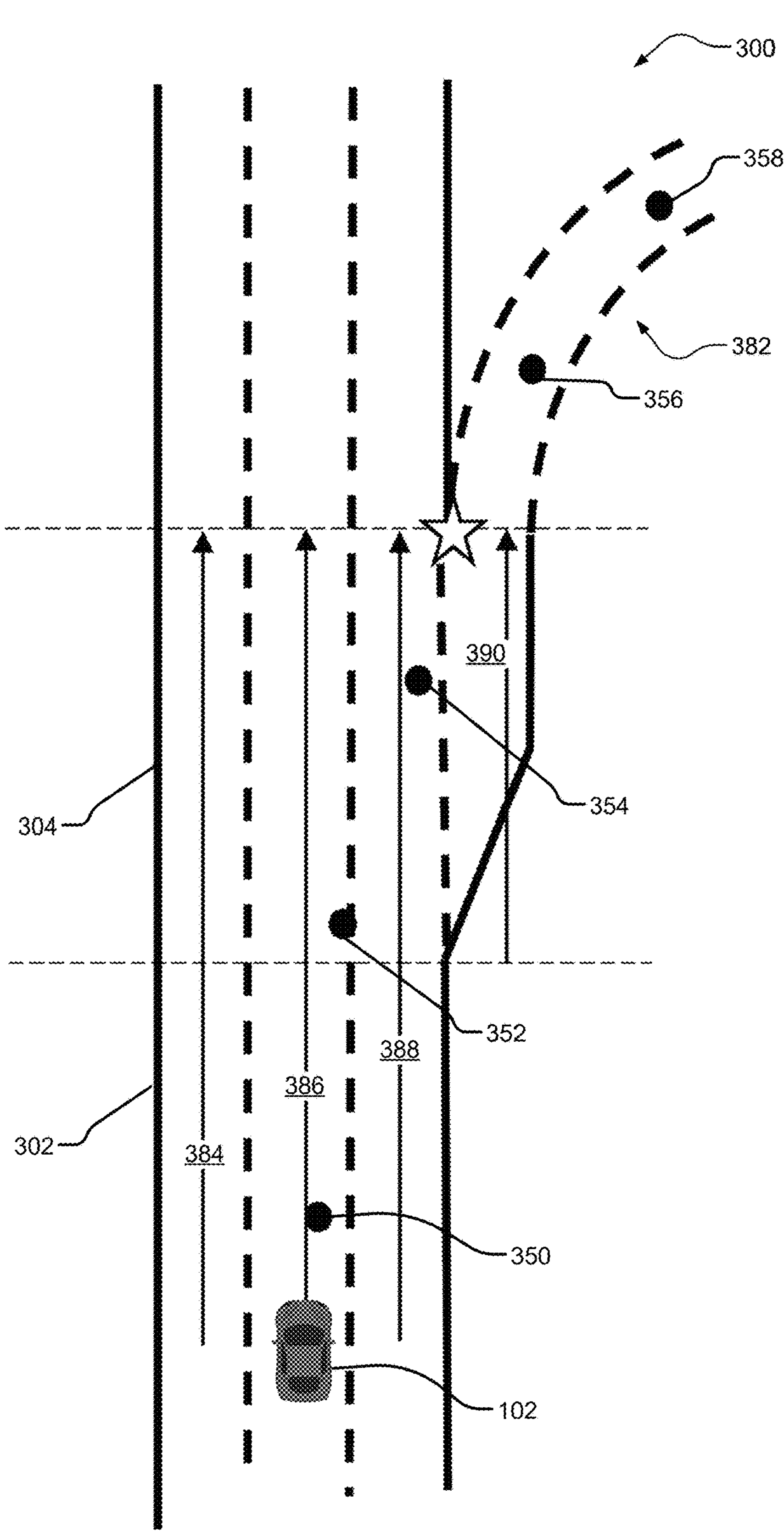

For example, FIG. 3 depicts an example map (e.g., a HD map) 300 including polygonal-shaped road segments 302, 304 and a sequence of waypoints 350, 352, 354, 356, 358 to guide the vehicle 102 to a selected destination. In this example, the map 300 is shown with a roadway having lanes 384, 386, 388 extending across both road segments 302, 304, and a lane (e.g., an exit lane) 390 extending across the road segment 304. A star on the map 300 indicates a split at end event representing the exit lane 390 splitting away from the other lanes 384, 386, 388. In the example of FIG. 3, the control module 104 can determine the distance of each lane 384, 386, 388, 390 as explained herein. As one example, in FIG. 3, the lanes 384, 386, 388 each extend a distance of 500 meters, and the lane 390 extends a distance of less than 500 meters. However, in this example, the selected destination dedicates that the navigation route pass through an exit ramp 382 extending from the lane 390. As such, the control module 104 may apply a weight to increase the distance (or a representative value) of the lane 390 to a maximum value or a value greater than 500 meters.

Then, after the lanes are identified, the end point distances for the lanes are determined, and optional weights are applied, the control module 104 of FIG. 1 identifies or selects a preferred lane along the navigation route based on the end point distances for the lanes. For example, the control module 104 may select the lane corresponding to the longest end point distance, whether weighted or not, as the preferred lane. For instance, in FIG. 3, the control module 104 may select the lane 390 as the preferred lane because the weighted end point distance (e.g., >500 m) for that lane is the largest amongst the end point distances (e.g., 500 m) for the other lanes 384, 386, 388.

The vehicle system 100 of FIG. 1 may then rely on the preferred lane for vehicle control. For example, once the control module 104 determines the preferred lane, the control module 104 can generate and transmit a signal indicative of the preferred lane to the vehicle control module 106. Then, once received, the vehicle control module 106 may generate a control signal for controlling at least one operation of the vehicle 102 based on the preferred lane along the navigation route. In various embodiments, the vehicle control module 106 may control any suitable operation of the vehicle 102, such as adaptive cruise control, lane change maneuver control, vehicle speed control, etc.

In various embodiments, the vehicle system 100 may display a map with the preferred lane for the driver of the vehicle 102 and/or other users in the vehicle 102. For example, once the preferred lane is identified, the control module 104 may generate and transmit a signal indicative of the preferred lane to the display module 108. Then, the display module 108 renders and displays a map including, for example, a roadway along the navigation route and the preferred lane. In some examples, the displayed map may also include the identified road segments along the navigation route.

For example, in various embodiments, the display module 108 may display the map 200 of FIG. 2, the map 300 of FIG. 3, etc. With respect to the example of FIG. 2, the display module 108 may display the map 200 with the road segments 202, 204, 206, 208, 210, 212, 214, 216, 218 and the lanes 280, 282, 284, 286, 288, 290. In this example, the road segments 202, 204, 206, 208 are preferred for the navigation route and the lane 284 is the preferred lane. Here, the lane 284 is shown with a solid arrow 240 passing through the lane 284, and the lanes 280, 282, 286, 288 are shown with arrows 242, 244, 246, 248 having a dashed-dot-dashed configuration. In such examples, the preferred road segments 202, 204, 206, 208 and the preferred lane 284 may be highlighted if desired.

Figure 4:
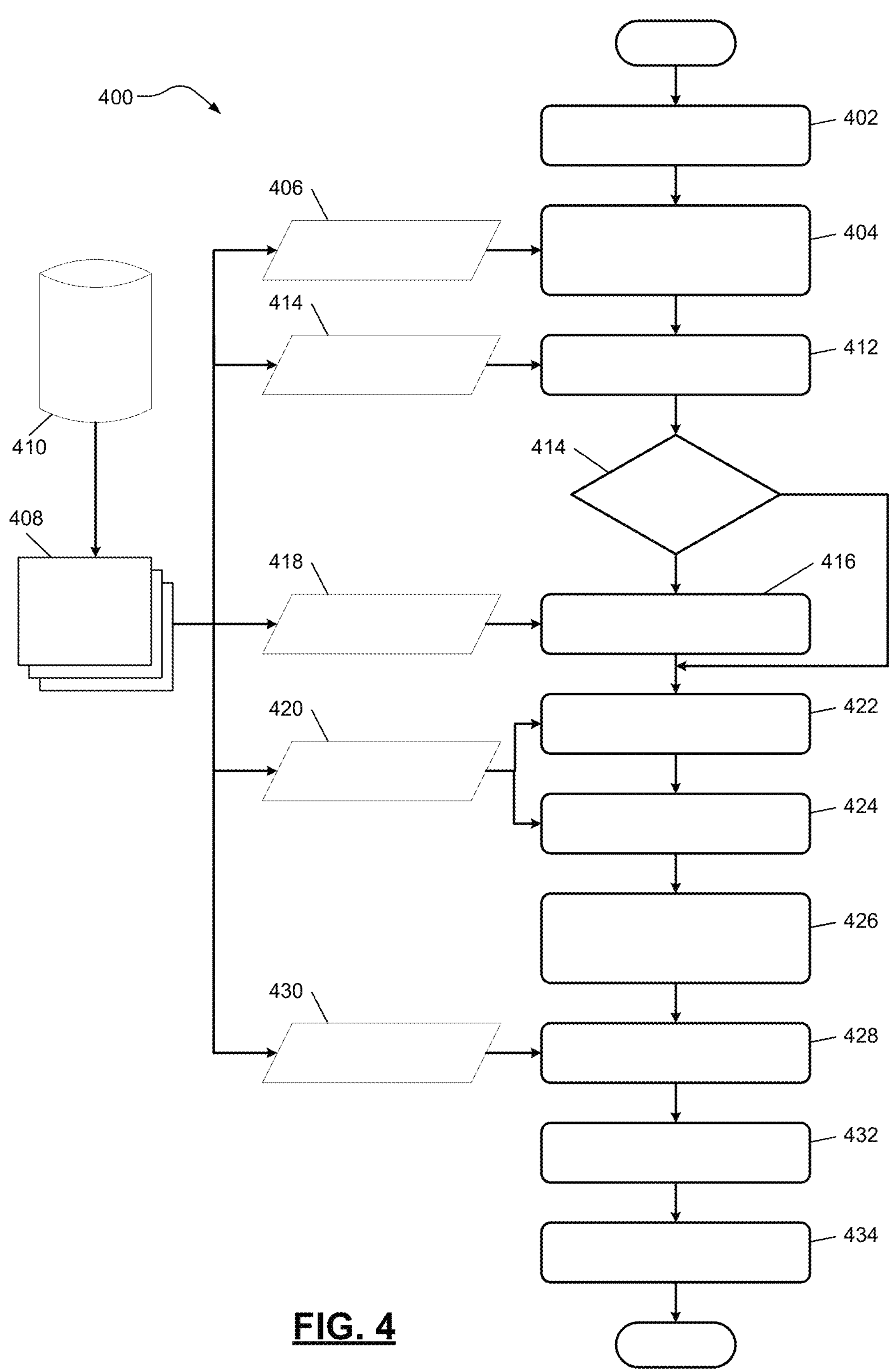
FIGS. 4-6 are flowcharts of example control processes for map matching at a road segment level and providing preferred lane travel for vehicle control applications and/or vehicle drivers, according to the present disclosure.
Figure 5:
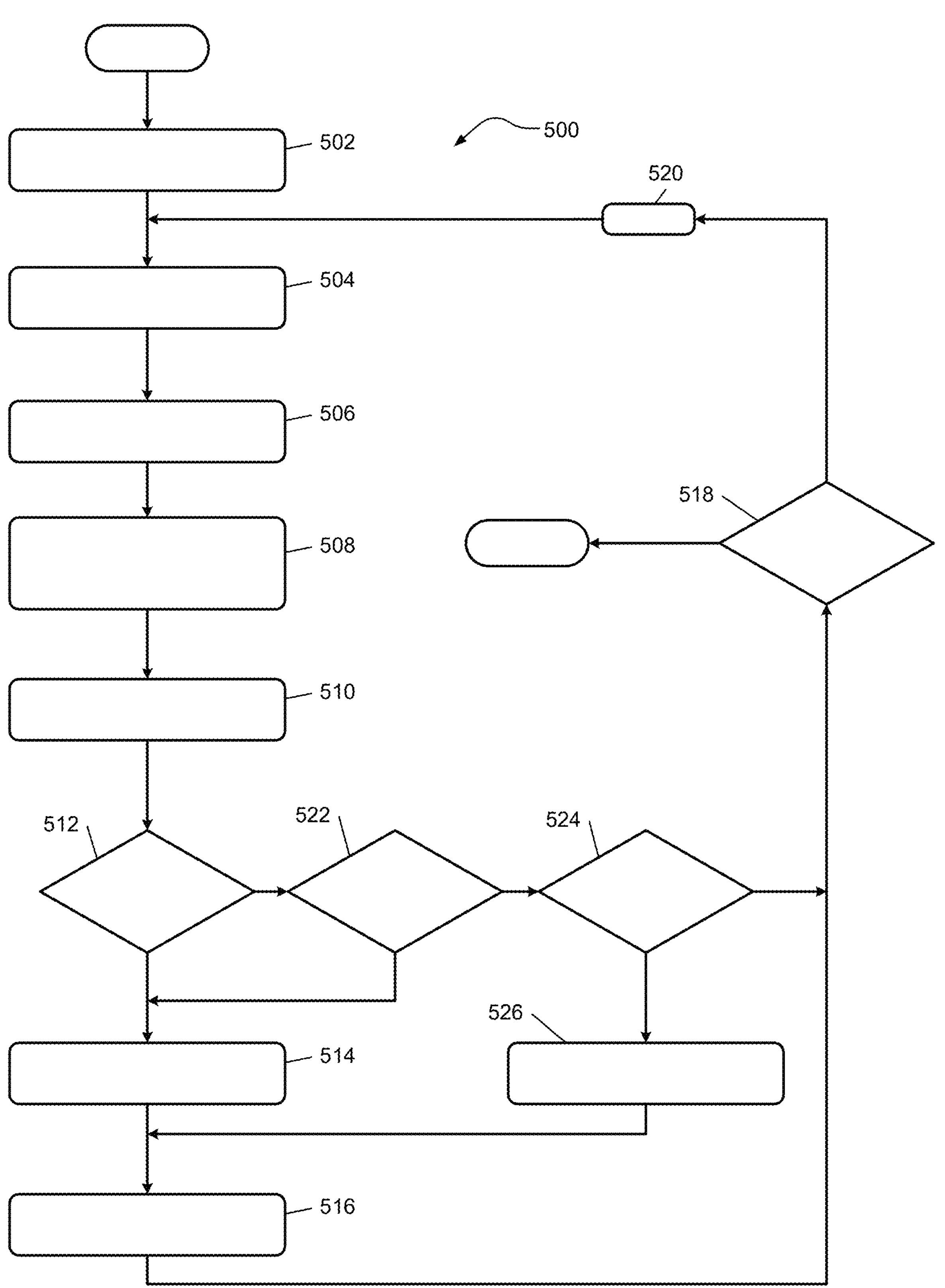
Figure 6:
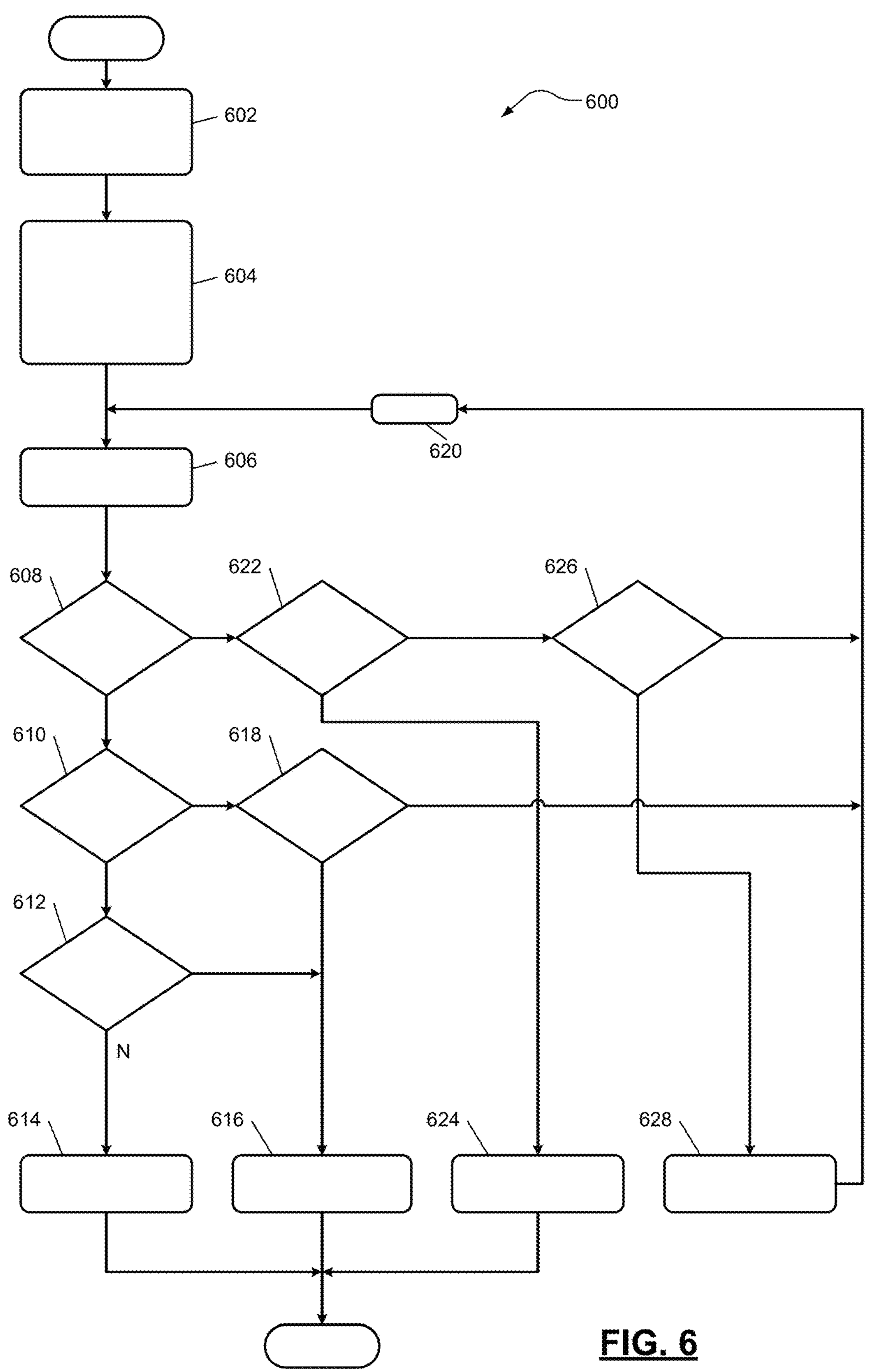

FIGS. 4-6 illustrate example control methods 400, 500, 600 employable by the vehicle system 100 of FIG. 1 for map matching at a road segment level and providing preferred lane travel for drivers and/or vehicle applications of a vehicle, such as the vehicle 102 of FIG. 1. Although the example control methods 400, 500, 600 are described in relation to the vehicle system 100 of FIG. 1 including the control module 104, the vehicle control module 106, etc., any one of the control methods 400, 500, 600 may be employable by another suitable system and/or module.

As shown in FIG. 4, the control method 400 begins at 402 by receiving a navigation route for a vehicle. For example, and as explained above, the navigation route may be generated based on a user-selected destination provided to a navigation system. When the destination is selected, the navigation system generates the navigation route including waypoints. The navigation route with the waypoints is then received by the control module 104. The control method 400 then proceeds to 404.

At 404, the control module 104 identifies road segments based on the waypoints. For example, in FIG. 4, road segment defined by polygons (or polygonal-shaped road segments) for a roadway may be stored in a database 410. In various embodiments, the database 410 may be equivalent to the map database 110 and/or the map database 114 of FIG. 1. In some examples, the polygonal-shaped road segments may be passed to and temporarily stored in one or more of map data caches 408 in FIG. 4. In such examples, the polygonal-shaped road segments may be retrieved for the control module 104 at a faster speed than directly from the database 110.

Then, the control module 104 receives the polygonal-shaped road segments and identifies a set of the road segments based on the waypoints. For example, the control module 104 can identify the set of the road segments based on a distance between one or more of the waypoints and the polygonal-shaped road segments, as explained above. For instance, and as explained above, the control module 104 may identify the set of road segments having the closest or smallest distance from one or more waypoints. In some examples, only waypoints within a defined distance from the road segment shaped polygons may be utilized, as explained above. The control method 400 then proceeds to 412.

At 412, the control module 104 filters out or otherwise removes one or more road segments of the identified set of road segments. In this example, the road segments may be removed based on headings of the identified set of road segments, headings of waypoints, and a threshold. In various embodiments, the control module 104 may receive the threshold, such as a road segment heading range 414, which can be temporarily stored in one or more of the map data caches 408 and/or stored in the database 410. As one example, the control module 104 may implement equation (1) above to determine which (if any) of the identified road segments to remove from the set. The control method 400 then proceeds to 414.

At 414, the control module 104 determines whether any gaps exist between road segments of the set of road segments. If no, the control method 400 proceeds to 422. If yes, the control method 400 proceeds to 416, where the control module 104 extracts one or more road segments to fill the gap(s) between road segments. In various embodiments, the control module 104 may receive road segment connectivity data 418 from one or more of the map data caches 408 and/or the database 410. Such data may be utilized by the control module 104 to fill the gap(s) with missed road segments. The control method 400 then proceeds to 422.

At 422, the control module 104 determines road segments of the set of road segments along the navigation route. Then, at 424 the control module 104 determines lane segments along the navigation route. With both determinations, the control module 104 may rely on road-to-lane segment relations 420 received from one or more of the map data caches 408 and/or the database 410. For example, the map data caches 408 and/or the database 410 may store data for the specific roadway traveled by the vehicle, including the number of lanes at different portions of the roadway (e.g., in different road segments of the roadway). With this data, the control module 104 can determine the road segments and the lane segments along the navigation route. The control method 400 then proceeds to 426.

At 426, the control module 104 determines end point distances for the lane segments. For example, the end point distance for each lane segment may refer to a distance of a lane (or a lane segment) between a start point and the end of that lane (or lane segment), as explained above. In such examples, the start point may refer to the location of the vehicle, a leading edge of a road segment, a start point of a lane, etc. Then, the control method 400 proceeds to 428.

At 428, the control module 104 applies weights (if applicable) to the lane segments. For example, the control module 104 may receive one or more precise lane events 430 for the roadway traveled by the vehicle, such as vehicle speeds, route directions, upcoming vehicle maneuvers, etc, and corresponding weight values. Then, based on the lane events along the lane, the control module 104 may add weight to one or more of the end point distances (or representative values thereof). The control method 400 then proceeds to 432.

At 432, the control module 104 provides lane level data to the vehicle control module 106. For example, at 432, the control module 104 may identify a preferred lane segment along the navigation route based on the determined end point distances. In doing so, the control module 104 may identify the lane segment having the longest end point distance (e.g., largest value) as the preferred lane segment, and then provide the preferred lane segment (e.g., lane level data) to the vehicle control module 106. The control method 400 then proceeds to 434, where the vehicle control module 106 controls the vehicle based on the lane level data (e.g., based on the preferred lane segment), as explained above. The control method 400 then ends as shown in FIG. 4.

In FIG. 5, the control method 500 begins at 502 by the control module 104 receiving a navigation route with waypoints $P_1, P_2, \ldots P_N$. Then, the control method 500 enters a loop starting from the first waypoint.

Specifically, the control method 500 proceeds to 504, 506. At 504, the control module 104 selects a waypoint $P_i$ from the set of received waypoints $P_1, P_2, \ldots P_N$. Then, at 506, the control module 104 determines a set of road segments (defined by polygons) within a defined distance (e.g., a threshold) from the waypoint $P_i$. The control method 500 then proceeds to 508, where the control module 104 filters road segments as explained above. For instance, the control module 104 may implement equation (1) above to remove a road segment from the determined set of road segments. The control method 500 then proceeds to 510, where the control module 104 determines candidate road segments $R_{head}$ from the set of road segments. In such examples, the candidate road segments $R_{head}$ may refer to road segments along the navigation route. Then, the control method 500 proceeds to 512.

At 512, the control module 104 determines whether each candidate road segment $R_{head}$ has been visited by waypoints on the navigation route greater than or equal to a defined threshold (e.g., 3 times, 4 times, etc.). If yes, the control method 500 proceeds to 514, where the control module 104 adds the particular candidate road segment(s) $R_{head}$ meeting the defined threshold of 512 to a set of preferred road segments $Set_{prefer}$. Then, the control method 500 proceeds to 516, where the control module 104 sets the candidate road segment(s) $R_{head}$ to equal a previous candidate road segment $R_{prehead}$. The control method 500 then proceeds to 518.

At 518, the control module 104 determines whether any additional waypoints of the set of received waypoints $P_1, P_2, \ldots P_N$ are available. If no, the control method 500 exits the loop and ends as shown in FIG. 5. If yes, the control method 500 proceeds to 520, where the control module 104 increments a value for i. Then, the control method 500 returns to 504, where the control module 104 selects the next waypoint $P_i$ (based on the incremented value for i) from the set of received waypoints $P_1, P_2, \ldots P_N$.

If no at 512, the control method 500 proceeds to 522. At 522, the control module 104 determines whether the candidate road segment(s) $R_{head}$ are a successor of a previous candidate road segment $R_{prehead}$. If yes, the control method 500 proceeds to 514 explained above. If no at 522, the control method 500 proceeds to 524.

At 524, the control module 104 determines whether a path exists from a previous candidate road segment $R_{prehead}$ to the candidate road segment(s) $R_{head}$. If yes, the control module 104 adds the path (e.g., road segment connectivity) between the previous candidate road segment $R_{prehead}$ and the current candidate road segment(s) $R_{head}$ to the set of preferred road segments $Set_{prefer}$. The control method 500 then proceeds to 516 explained above. If no at 524, the control method 500 proceeds to 518 explained above.

In FIG. 6, the control method 600 begins at 602 by receiving a set of preferred road segments $Set_{prefer}$. In various embodiments, the set of preferred road segments $Set_{prefer}$ may be accumulated according to the control method 500 of FIG. 5. The control method 600 then proceeds to 604, where the control module 104 receives each lane, which is composed by road segments $R_1, R_2, \ldots R_N$. Then, the control method 600 enters a loop.

Specifically, the control method 600 proceeds to 606, 608. At 606, the control module 104 selects a road segment $R_i$ from the set of road segments $R_1, R_2, \ldots R_N$. Then, at 608, the control module 104 determines whether the selected road segment $R_i$ is in the set of preferred road segments $Set_{prefer}$. If yes, the control method 600 proceeds to 610. At 610, the control module 104 determines whether the value of i is equal to N (with respect to the road segments). If yes at 610, the control method 600 proceeds to 612. At 612, the control module 104 determines whether the road segment $R_N$ is ending or ended. If no at 612, the control method 600 proceeds to 614 where the control module 104 determines a preferred lane distance $Pref_{dist}$ (or an end point distance) by setting it to equal an infinite (or maximum) value. The control method 600 may then exit the loop and end as shown in FIG. 6.

If, however, the control module 104 determines that the road segment $R_N$ is ending or ended at 612 (e.g., yes at 612), the control method 600 proceeds to 616. At 616, the control module 104 determines a preferred lane distance $Pref_{dist}$ (or an end point distance) by summing the lengths of lane segments of the road. The control method 600 may then exit the loop and end as shown in FIG. 6.

Reverting back to 610, if the control module 104 determines that the value of i is not equal to N (e.g., no at 610), the control method 600 proceeds to 618. At 618, the control module 104 determines whether the next road segment Rin is in the set of preferred road segments $Set_{prefer}$. If no, the control method 600 proceeds to 616 explained above. If yes at 618, the control method 600 proceeds to 620. At 620, the control module 104 increments a value for i. Then, the control method 600 returns to 606, where the control module 104 selects another selected road segment $R_i$ (based on the incremented value for i) from the set of road segments $R_1$, $R_2$, . . . $R_N$.

Reverting back to 608, if the control module 104 determines that the selected road segment $R_i$ is not in the set of preferred road segments $Set_{prefer}$ (e.g., no at 608), the control method 600 proceeds to 622. At 622, the control module 104 determines whether the value of i is equal to N (with respect to the road segments). If yes at 622, the control method 600 proceeds to 624. At 624, the control module 104 sets a preferred lane flag $Pref_{flag}$ to false, which indicates the lane is not along the navigation route. The control method 600 may then exit the loop and end as shown in FIG. 6.

If, however, the control module 104 determines whether the value of i is not equal to N (with respect to the road segments) at 622 (e.g., no at 622), the control method 600 proceeds to 626. At 626, the control module 104 determines whether the next road segment $R_{i+1}$ is in the set of preferred road segments $Set_{prefer}$. If no, the control method 600 proceeds to 620 explained above. If yes at 626, the control method 600 proceeds to 628. At 628, the control module 104 sets the preferred lane flag $Pref_{flag}$ to true, which indicates this lane is along the navigation route. The control method 600 then proceeds to 620 explained above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for controlling a vehicle, the vehicle system comprising:
- a vehicle control module;
- a control module in communication with the vehicle control module, the control module configured to:
  - receive a navigation route;
  - receive a plurality of road segments defined by polygons;
  - identify a set of road segments from the plurality of road segments based on a distance between one or more waypoints of the navigation route and the polygons;
  - for each road segment from the set of road segments along the navigation route, determine lanes of the road segments along the navigation route and end point distances for the lanes; and
  - identify a preferred lane along the navigation route based on the end point distances for the lanes; and
- wherein the vehicle control module is configured to generate a control signal for controlling at least one operation of the vehicle based on the identified preferred lane along the navigation route.

2. The vehicle system of claim 1, wherein the control module is configured to receive the navigation route based on a defined destination input into a navigation system.

3. The vehicle system of claim 1, wherein the control module is configured to identify the set of road segments based on only the one or more waypoints being within a distance threshold from the polygons.

4. The vehicle system of claim 3, wherein the control module is configured to remove one or more road segments of the identified set of road segments based on headings for the identified set of road segments.

5. The vehicle system of claim 4, wherein the control module is configured to determine one or more gaps between two road segments appear due to a lack of density of the waypoints and identify correct database road segments to fill the gaps between the two road segments.

6. The vehicle system of claim 3, wherein the control module is configured to identify the preferred lane along the navigation route having the longest end point distance.

7. The vehicle system of claim 6, further comprising a database configured to store the plurality of road segments, wherein the control module is configured to extract the plurality of road segments from the database.

8. The vehicle system of claim 7, wherein the database is an in-vehicle database.

9. The vehicle system of claim 3, further comprising a display module in communication with the control module, the display module configured to display a map including the preferred lane along the navigation route.

10. A vehicle system comprising:
- a vehicle control module of a vehicle;
- a database; and
- a control module in communication with the vehicle control module and the database, the control module configured to:
  - receive a navigation route based on a defined destination input into a navigation system;
  - receive, from the database, a plurality of road segments defined by polygons;
  - identify a set of road segments from the plurality of road segments based on a distance between one or more waypoints of the navigation route and the polygons;
  - for each road segment from the set of road segments along the navigation route, determine lanes of the road segments along the navigation route and end point distances for the lanes; and
  - identify a preferred lane along the navigation route having the longest end point distance; and
- wherein the vehicle control module is configured to generate a control signal for controlling at least one operation of the vehicle based on the identified preferred lane along the navigation route.

11. The vehicle system of claim 10, wherein the database is an in-vehicle database.

12. The vehicle system of claim 10, wherein the control module is configured to identify the set of road segments based on only the one or more waypoints being within a distance threshold from the polygons.

13. A vehicle control method comprising:

receiving a navigation route for a vehicle;

receiving a plurality of road segments defined by polygons;

identifying a set of road segments from the plurality of road segments based on a distance between one or more waypoints of the navigation route and the polygons;

for each road segment from the set of road segments along the navigation route, determining lanes of the road segments along the navigation route and end point distances for the lanes;

identifying a preferred lane along the navigation route based on the end point distances for the lanes; and controlling at least one operation of the vehicle based on the identified preferred lane along the navigation route.

14. The vehicle control method of claim 13, wherein identifying the preferred lane along the navigation route includes identifying the preferred lane along the navigation route having the longest end point distance.

15. The vehicle control method of claim 14, further comprising displaying a map including the preferred lane along the navigation route.

16. The vehicle control method of claim 15, wherein identifying the set of road segments includes identifying the set of road segments based on only the one or more waypoints being within a distance threshold from the polygons.

17. The vehicle control method of claim 16, wherein receiving the plurality of road segments includes receiving the plurality of road segments from an in-vehicle database.

18. The vehicle control method of claim 17, wherein receiving the navigation route includes receiving the navigation route based on a defined destination input into a navigation system.

19. The vehicle control method of claim 18, further comprising removing one or more road segments of the identified set of road segments based on headings for the identified set of road segments.

20. The vehicle control method of claim 19, further comprising determining one or more gaps between two road segments appear and identifying correct database road segments to fill the gaps between the two road segments.

* * * * *